(12) United States Patent
Jolivet

(10) Patent No.: US 12,530,951 B2
(45) Date of Patent: *Jan. 20, 2026

(54) METHOD AND SYSTEM FOR ENROLLING A CAMERA INTO A VIDEO SURVEILLANCE SYSTEM

(71) Applicant: GENETEC INC., Saint-Laurent (CA)

(72) Inventor: Francis Jolivet, Montréal (CA)

(73) Assignee: GENETEC INC., Saint-Laurent (CA)

( * ) Notice: Subject to any disclaimer, the term of this patent is extended or adjusted under 35 U.S.C. 154(b) by 61 days.

This patent is subject to a terminal disclaimer.

(21) Appl. No.: 18/680,763

(22) Filed: May 31, 2024

(65) Prior Publication Data

US 2024/0404381 A1 Dec. 5, 2024

Related U.S. Application Data

(63) Continuation of application No. 16/715,432, filed on Dec. 16, 2019, now Pat. No. 12,002,338.

(Continued)

(51) Int. Cl.
*G08B 13/196* (2006.01)
*H04N 7/18* (2006.01)
(Continued)

(52) U.S. Cl.
CPC ... *G08B 13/19656* (2013.01); *G08B 13/1968* (2013.01); *G08B 13/19682* (2013.01);
(Continued)

(58) Field of Classification Search
CPC . H04W 12/03; H04W 12/0471; H04W 12/50; H04W 4/80; H04W 76/11; H04W 76/14; H04W 4/70; H04W 12/06; H04W 12/08; H04W 12/033; H04W 12/04; H04W 12/068; H04W 12/069; H04L 63/18; H04L 12/4633; H04L 63/0853; H04L 9/3226; H04L 63/08; H04L 9/3247; H04L 63/0272; H04L 63/0281; H04L 63/0428; H04L 63/061; H04L 63/083; H04L 63/12; H04L 67/02; H04L 67/1002; H04L 67/1008; H04L 67/125; H04L 2463/082;
(Continued)

(56) References Cited

U.S. PATENT DOCUMENTS 7,455,229 B2 11/2008 Tanaka
8,115,819 B2 2/2012 Anderson
(Continued)

FOREIGN PATENT DOCUMENTS

CN 205232324 U 5/2011

*Primary Examiner* — Greg C Bengzon
(74) *Attorney, Agent, or Firm* — NORTON ROSE FULBRIGHT CANADA LLP

(57) ABSTRACT

Methods and systems for enrolling a camera into a video surveillance system are described herein. A display of a mobile device may be used to display visual information indicative of enrollment information for enrolling the camera into the video surveillance system. The camera reads the visual information to obtain the enrollment information. The camera transmits an enrollment request to a server of the video surveillance system based on the enrollment information. The server enrolls the camera into the video surveillance system based on the enrollment request. The methods and systems described herein may be used for enrolling any suitable networked device into a system.

23 Claims, 7 Drawing Sheets

Related U.S. Application Data

(60) Provisional application No. 62/928,061, filed on Oct. 30, 2019, provisional application No. 62/780,216, filed on Dec. 15, 2018.

(51) Int. Cl.
 *H04L 41/08* (2022.01)
 *H04L 41/0806* (2022.01)

(52) U.S. Cl.
 CPC ....... *G08B 13/19684* (2013.01); *H04N 7/181* (2013.01); *H04L 41/0806* (2013.01); *H04L 41/0889* (2013.01)

(58) Field of Classification Search
 CPC ............. H04L 63/0442; H04L 63/0823; H04L 63/101; H04L 9/321; H04L 41/0806; H04L 9/3242; H04L 9/3268; H04L 41/0889; H04L 9/14; H04L 9/3073; H04L 9/3297; H04L 12/28; H04L 2209/38; H04L 9/0836; H04L 9/32; H04L 9/3239; H04N 21/25816; H04N 7/18; H04N 21/60; H04N 21/63345; H04N 7/181; H04N 21/2541; H04N 21/26613; H04N 5/913; G06F 21/44; G06F 21/606; G06F 21/40; G08B 13/19656; G08B 13/1968; G08B 13/19682; G08B 13/19684; G08B 25/003
 See application file for complete search history.

(56) References Cited

U.S. PATENT DOCUMENTS

| | | |
|---|---|---|
| 8,215,541 B2 | 7/2012 | Bucher et al. |
| 9,495,530 B2 | 11/2016 | Dittrich |
| 10,475,315 B2 | 11/2019 | Madar |
| 10,719,071 B2 | 7/2020 | Wu |
| 2004/0222300 A1 | 11/2004 | Strickland |
| 2005/0203912 A1 | 9/2005 | Beach et al. |
| 2005/0282531 A1 | 12/2005 | Andreasson |
| 2006/0135064 A1 | 6/2006 | Cho et al. |
| 2006/0209176 A1 | 9/2006 | Nakamura |
| 2006/0285126 A1 | 12/2006 | Braswell et al. |
| 2007/0106895 A1 | 5/2007 | Huang |
| 2008/0250122 A1 | 10/2008 | Zsigmond et al. |
| 2009/0225164 A1 | 9/2009 | Renkis |
| 2012/0204032 A1 | 8/2012 | Wilkins |
| 2012/0282884 A1 | 11/2012 | Sun |
| 2013/0155232 A1 | 6/2013 | Bauereiss |
| 2013/0229511 A1 | 9/2013 | Oostendorp |
| 2014/0025795 A1 | 1/2014 | Fiennnes |
| 2014/0186049 A1 | 7/2014 | Oshima |
| 2014/0282683 A1 | 9/2014 | Chee |
| 2014/0342724 A1 | 11/2014 | Hill |
| 2015/0022666 A1 | 1/2015 | Kay |
| 2015/0229475 A1 | 8/2015 | Benoit |
| 2015/0351204 A1 | 12/2015 | Hershberg |
| 2016/0021292 A1 | 1/2016 | Zhang |
| 2016/0037436 A1 | 2/2016 | Spencer |
| 2016/0105644 A1 | 4/2016 | Smith |
| 2016/0150068 A1 | 5/2016 | Wada |
| 2016/0198210 A1 | 7/2016 | Torikai |
| 2016/0357762 A1 | 12/2016 | Aghdasi |
| 2017/0054902 A1 | 2/2017 | Park |
| 2017/0064238 A1 | 3/2017 | Kardashov |
| 2017/0171607 A1 | 6/2017 | Britt |
| 2017/0195386 A1 | 7/2017 | Nathan |
| 2017/0214542 A1 | 7/2017 | Erdmann |
| 2017/0223808 A1 | 8/2017 | Barna |
| 2017/0278365 A1 | 9/2017 | Madar |
| 2017/0280488 A1 | 9/2017 | Kawasaki |
| 2018/0063120 A1 | 3/2018 | Kim |
| 2018/0070001 A1 | 3/2018 | Nassor et al. |
| 2018/0109381 A1 | 4/2018 | Cammarota |
| 2018/0146050 A1 | 5/2018 | Tanaka |
| 2018/0159836 A1 | 6/2018 | Wakai |
| 2018/0225444 A1 | 8/2018 | Frenz |
| 2018/0270066 A1 | 9/2018 | Doyon et al. |
| 2018/0278612 A1 | 9/2018 | Pattar |
| 2018/0330368 A1 | 11/2018 | Slupesky |
| 2018/0376527 A1 | 12/2018 | Hamada |
| 2019/0114413 A1 | 4/2019 | Ozaki |
| 2019/0132932 A1 | 5/2019 | Klecha |
| 2019/0149772 A1 | 5/2019 | Fernandes |
| 2019/0238405 A1 | 8/2019 | Karivaradaswamy |
| 2019/0244033 A1 | 8/2019 | Renkis |
| 2020/0120202 A1 | 4/2020 | Jakobsson |
| 2020/0127866 A1 | 4/2020 | Lee |
| 2020/0137354 A1 | 4/2020 | Nathan |
| 2021/0258308 A1 | 8/2021 | Avetisov |
| 2022/0004617 A1 | 1/2022 | Irwin, III |

METHOD AND SYSTEM FOR ENROLLING A CAMERA INTO A VIDEO SURVEILLANCE SYSTEM

CROSS-REFERENCE TO RELATED APPLICATIONS

The present application is a continuation of U.S. patent application Ser. No. 16/715,432 filed on Dec. 16, 2019, issued as U.S. Pat. No. 12,002,338, which claims priority under 35 U.S.C. 119 (e) of U.S. Provisional Patent Application bearing Ser. No. 62/780,216, filed on Dec. 15, 2018, and U.S. Provisional Patent Application bearing Ser. No. 62/928,061, filed on Oct. 30, 2019, the contents of which are hereby incorporated by reference.

TECHNICAL FIELD

The present disclosure relates generally to the field of network devices, and, more particularly, to methods and systems for enrolling network devices into systems.

BACKGROUND OF THE ART

A video surveillance system may have a number of cameras connected to a server for the purpose of transmitting video data to the server. The server may archive the video data, manage and control the cameras, provide a workstation environment, for example, for a live view of the camera feeds, and/or provide access to camera feeds by remote workstations. Commonly the cameras used in video surveillance systems are Internet Protocol (IP) cameras that communicate with the server using a computer network.

Prior to the server receiving the video data from the cameras, each of the cameras typically needs to be enrolled into the video surveillance system. That is, the cameras typically need to know information regarding the server that it is to communicate with and the server may need to know information pertaining to each camera. For example, enrolling a camera into a video surveillance system may comprise connecting the camera to a network, manually programming the camera with the IP address of the server and using tools to identify the IP address of the camera as well as login credentials for the camera, and providing such information to the server.

Thus, conventional techniques for enrolling cameras into a video surveillance system may be complicated and/or cumbersome. They may require specialized expertise, be time consuming and be sensitive to human errors. When a surveillance system comprises a large number of cameras, this may translate in significant costs of installation. Other networked devices may have similar deficiencies with enrollment into a system.

As such, there is room for improvement.

SUMMARY

The present disclosure is drawn to systems and methods for enrolling a networked device into a system, such as a video camera into a video surveillance system. The systems and methods described herein for enrolling a camera into a video surveillance system are, for example, based on providing to the camera visual information indicative of enrollment information for enrolling the camera into the video surveillance system.

In one aspect, there is provided a method for enrolling a camera into a video surveillance system. The method comprises: receiving, at a mobile device, an indication to enroll the camera into the video surveillance system; obtaining, at the mobile device, visual information indicative of enrollment information for enrolling the camera into the video surveillance system; and displaying, on a display of the mobile device, the visual information for being read by the camera, the camera configured to request enrollment from a server of the video surveillance system based on the enrollment information obtainable from the visual information.

In some embodiments, the visual information is a visual code having encoded therein the enrollment information.

In some embodiments, obtaining the visual information comprises generating, at the mobile device, the visual code to encode therein the enrollment information.

In some embodiments, the enrollment information comprises server location information of the server of the video surveillance system.

In some embodiments, the server location information comprises an IP address of the server.

In some embodiments, the method further comprises transmitting, by the mobile device, an enrollment initiation request to the server, the enrollment initiation request indicative of an intention to enroll the camera into the video surveillance system.

In some embodiments, the method further comprises receiving, at the mobile device, at least in part the enrollment information from the server.

In some embodiments, the enrollment information comprising secret information for use by the camera in requesting enrollment from the server.

In some embodiments, the secret information comprises a unique identifier for use by the camera in requesting enrollment from the server.

In some embodiments, the secret information comprises a public encryption key for use by the camera in requesting enrollment from the server.

In some embodiments, the method further comprises transmitting, by the mobile device, camera location information to the server.

In some embodiments, the camera location information comprises GPS position information of the mobile device.

In some embodiments, the method further comprises providing, by the mobile device, an indication that the camera has been enrolled in response to receiving confirmation from the server that the camera has been enrolled into the video surveillance system.

In some embodiments, the method further comprises receiving, at the mobile device, camera configuration information and providing, by the mobile device, the camera configuration information to the camera.

In one aspect there is provided a method for enrolling a camera into a video surveillance system. The method comprises: reading, by the camera, visual information indicative of enrollment information for enrolling the camera into the video surveillance system; obtaining, by the camera, the enrollment information from the visual information; and transmitting, by the camera, an enrollment request to a server of the video surveillance system based on the enrollment information, the server configured to enroll the camera into the video surveillance system based on the enrollment request.

In some embodiments, the visual information is a visual code having encoded therein the enrollment information, and wherein obtaining the enrollment information comprises extracting, by the camera, the enrollment information from the visual code.

In some embodiments, the enrollment information comprises server location information of the server of the video surveillance system.

In some embodiments, the server location information comprises an IP address of the server, and wherein the enrollment request is transmitted to the IP address of the server.

In some embodiments, the enrollment information comprises secret information for use by the camera in requesting enrollment from the server.

In some embodiments, the secret information comprises a unique identifier, and wherein the enrollment request comprises the unique identifier and an IP address of the camera.

In some embodiments, the secret information comprises a public encryption key, and wherein the enrollment request comprises login credentials for the camera encrypted using the public encryption key.

In some embodiments, reading the visual information comprises reading the visual information from a display of a mobile device.

In one aspect there is provided a method for enrolling a camera into a video surveillance system. The method comprises: receiving, at a server of the video surveillance system, an enrollment initiation request from a mobile device, the enrollment initiation request indicative of an intention to enroll the camera into the video surveillance system; receiving, at the server, an enrollment request from the camera; and enrolling, at the server, the camera into the video surveillance system based on the enrollment initiation request from the mobile device and the enrollment request from the camera.

In some embodiments, the method further comprises transmitting, by the server, enrollment information to the mobile device in response to the enrollment initiation request.

In some embodiments, the enrollment information comprises server location information of the server.

In some embodiments, the server location information comprises an IP address of the server.

In some embodiments, the enrollment information comprises secret information for use by the camera in requesting enrollment from the server.

In some embodiments, the secret information comprises a unique identifier for the camera.

In some embodiments, the camera is enrolled into the video surveillance system when the enrollment request from the camera comprises the unique identifier.

In some embodiments, the secret information comprises a public encryption key.

In some embodiments, the method further comprises decrypting, at the server, at least in part the enrollment request with a private encryption key corresponding to the public encryption key.

In some embodiments, the method further comprises creating, at the server, a new camera entry for the camera in response to the enrollment initiation request.

In some embodiments, the enrollment initiation request comprises camera location information, and the method further comprises storing the camera location information in association with the new camera entry.

In some embodiments, the camera location information comprises GPS position information of the mobile device.

In some embodiments, the camera location information comprises text indicative of a location of the camera.

In some embodiments, the method further comprises transmitting, by the server, confirmation that the camera has been enrolled to the mobile device.

In some embodiments, the method further comprises receiving, at the server, camera configuration information from the mobile device and transmitting, by the server, the camera configuration information to the camera.

In one aspect there is provided a method for enrolling a camera into a video surveillance system. The method comprises: displaying, on a display of a mobile device, visual information indicative of enrollment information for enrolling the camera into the video surveillance system; reading, by the camera, the visual information to obtain the enrollment information; transmitting, by the camera, an enrollment request to a server of the video surveillance system based on the enrollment information; and enrolling, by the server, the camera into the video surveillance system based on the enrollment request.

In some embodiments, the visual information is a visual code having encoded therein the enrollment information, and wherein the method further comprises extracting, by the camera, the enrollment information from the visual code.

In some embodiments, the enrollment information comprises server location information of the server of the video surveillance system.

In some embodiments, the server location information comprises an IP address of the server, and wherein the enrollment request is transmitted to the IP address of the server.

In some embodiments, the method further comprises transmitting, by the mobile device, an enrollment initiation request to the server, the enrollment initiation request indicative of an intention to enroll the camera into the video surveillance system.

In some embodiments, the method further comprises receiving, at the mobile device, at least in part the enrollment information from the server.

In some embodiments, the enrollment information received from the server comprising secret information for use by the camera in requesting enrollment from the server.

In some embodiments, the secret information comprises a unique identifier and wherein the camera transmits the enrollment request comprising the unique identifier.

In some embodiments, the secret information comprises a public encryption key and wherein the camera encrypts at least in part the enrollment request using the public encryption key.

In some embodiments, the method further comprises transmitting, by the mobile device, camera location information to the server.

In some embodiments, the camera location information comprises GPS position information of the mobile device.

In some embodiments, the camera location information is inputted into the mobile device by a user.

In some embodiments, enrolling the camera into the video surveillance system is further based on the camera location information.

In one aspect there is provided a mobile device comprising: a display; a processing unit; and a non-transitory computer-readable memory having stored thereon program instructions. The program instructions executable by the processing unit for: receiving an indication to enroll a camera into a video surveillance system; obtaining visual information indicative of enrollment information for enrolling the camera into the video surveillance system; and displaying, via the display, the visual information for being read by the camera, the camera configured to request enrollment from a server of the video surveillance system based on the enrollment information obtainable from the visual information. The display may be connected to the processing unit in any suitable manner.

In some embodiments, the visual information is a visual code having encoded therein the enrollment information.

In some embodiments, obtaining the visual information comprises generating the visual code to encode therein the enrollment information.

In some embodiments, the enrollment information comprises server location information of the server of the video surveillance system.

In some embodiments, the server location information comprises an IP address of the server.

In some embodiments, the program instructions are further executable by the processing unit for transmitting an enrollment initiation request to the server, the enrollment initiation request indicative of an intention to enroll the camera into the video surveillance system.

In some embodiments, the program instructions are further executable by the processing unit for receiving, at the mobile device, at least in part the enrollment information from the server.

In some embodiments, the enrollment information comprising secret information for use by the camera in requesting enrollment from the server.

In some embodiments, the secret information comprises a unique identifier for use by the camera in requesting enrollment from the server.

In some embodiments, the secret information comprises a public encryption key for use by the camera in requesting enrollment from the server.

In some embodiments, the program instructions are further executable by the processing unit for transmitting camera location information to the server.

In some embodiments, the camera location information comprises GPS position information of the mobile device.

In some embodiments, the program instructions are further executable by the processing unit for providing an indication that the camera has been enrolled in response to receiving confirmation from the server that the camera has been enrolled into the video surveillance system.

In some embodiments, the program instructions are further executable by the processing unit for receiving camera configuration information and providing the camera configuration information to the camera.

In one aspect there is provided a camera comprising: an optical sensor; a processing unit; and a non-transitory computer-readable memory having stored thereon program instructions. The program instructions executable by the processing unit for: reading, via the optical sensor, visual information indicative of enrollment information for enrolling the camera into a video surveillance system; obtaining the enrollment information from the visual information; and transmitting an enrollment request to a server of the video surveillance system based on the enrollment information, the server configured to enroll the camera into the video surveillance system based on the enrollment request. The optical sensor may be connected to the processing unit in any suitable manner.

In some embodiments, the visual information is a visual code having encoded therein the enrollment information, and wherein obtaining the enrollment information comprises extracting the enrollment information from the visual code.

In some embodiments, the enrollment information comprises server location information of the server of the video surveillance system.

In some embodiments, the server location information comprises an IP address of the server, and wherein the enrollment request is transmitted to the IP address of the server.

In some embodiments, the enrollment information comprises secret information for use by the camera in requesting enrollment from the server.

In some embodiments, the secret information comprises a unique identifier, and wherein the enrollment request comprises the unique identifier and an IP address of the camera.

In some embodiments, the secret information comprises a public encryption key, and wherein the enrollment request comprises login credentials for the camera encrypted using the public encryption key.

In some embodiments, reading the visual information comprises reading the visual information from a display of a mobile device.

In one aspect there is provided a server of a video surveillance system. The server comprises: a processing unit; and a non-transitory computer-readable memory having stored thereon program instructions. The program instructions executable by the processing unit for: receiving an enrollment initiation request from a mobile device, the enrollment initiation request indicative of an intention to enroll the camera into the video surveillance system; receiving an enrollment request from the camera; and enrolling, at the server, the camera into the video surveillance system based on the enrollment initiation request from the mobile device and the enrollment request from the camera.

In some embodiments, the program instructions are further executable by the processing unit for transmitting enrollment information to the mobile device in response to the enrollment initiation request.

In some embodiments, the enrollment information comprises server location information of the server.

In some embodiments, the server location information comprises an IP address of the server.

In some embodiments, the enrollment information comprises secret information for use by the camera in requesting enrollment from the server.

In some embodiments, the secret information comprises a unique identifier for the camera.

In some embodiments, the camera is enrolled into the video surveillance system when the enrollment request from the camera comprises the unique identifier.

In some embodiments, the secret information comprises a public encryption key.

In some embodiments, the program instructions are further executable by the processing unit for decrypting at least in part the enrollment request with a private encryption key corresponding to the public encryption key.

In some embodiments, the program instructions are further executable by the processing unit for creating, at the server, a new camera entry for the camera in response to the enrollment initiation request.

In some embodiments, the enrollment initiation request comprises camera location information, and wherein the program instructions are further executable by the processing unit for storing the camera location information in association with the new camera entry.

In some embodiments, the camera location information comprises GPS position information of the mobile device.

In some embodiments, the camera location information comprises text indicative of a location of the camera.

In some embodiments, the program instructions are further executable by the processing unit for transmitting confirmation that the camera has been enrolled to the mobile device.

In some embodiments, the program instructions are further executable by the processing unit for receiving camera configuration information from the mobile device and transmitting the camera configuration information to the camera.

In one aspect there is provided a video surveillance system. The video surveillance comprises: a camera configured for reading visual information indicative of enrollment information for enrolling the camera into the video surveillance system, obtaining the enrollment information from the visual information, and transmitting an enrollment request to a server of the video surveillance system based on the enrollment information; and the server configured for enrolling the camera into the video surveillance system based on the enrollment request.

In some embodiments, the visual information is displayed on a display of a mobile device.

In some embodiments, the video surveillance system comprises the mobile device.

In some embodiments, the visual information is a visual code having encoded therein the enrollment information, and wherein the camera is further configured for extracting the enrollment information from the visual code.

In some embodiments, the enrollment information comprises server location information of the server of the video surveillance system.

In some embodiments, the server location information comprises an IP address of the server, and wherein the enrollment request is transmitted to the IP address of the server.

In some embodiments, the server is further configured for receiving from the mobile device an enrollment initiation request indicative of an intention to enroll the camera into the video surveillance system, and transmitting at least in part the enrollment information to the mobile device.

In some embodiments, the enrollment information comprising secret information for use by the camera in requesting enrollment from the server.

In some embodiments, the secret information comprises a unique identifier and wherein the camera transmits the enrollment request comprising the unique identifier.

In some embodiments, the secret information comprises a public encryption key and wherein the camera encrypts the enrollment request using the public encryption key.

In some embodiments, the server is further configured for receiving camera location information from the mobile device.

In some embodiments, the camera location information comprises GPS position information of the mobile device.

In some embodiments, the camera location information is inputted into the mobile device by a user.

In some embodiments, enrolling the camera into the video surveillance system is further based on the camera location information.

In one aspect there is provided a non-transitory computer-readable medium having stored thereon program instructions for enrolling a camera into a video surveillance system. The program instructions are executable by a processing unit for: receiving, at a mobile device, an indication to enroll the camera into the video surveillance system; obtaining, at the mobile device, visual information indicative of enrollment information for enrolling the camera into the video surveillance system; and displaying, on a display of the mobile device, the visual information for being read by the camera, the camera configured to request enrollment from a server of the video surveillance system based on the enrollment information obtainable from the visual information.

In some embodiments, the visual information is a visual code having encoded therein the enrollment information.

In some embodiments, obtaining the visual information comprises generating, at the mobile device, the visual code to encode therein the enrollment information.

In some embodiments, the enrollment information comprises server location information of the server of the video surveillance system.

In some embodiments, the server location information comprises an IP address of the server.

In some embodiments, the program instructions are further executable by the processing unit for transmitting, by the mobile device, an enrollment initiation request to the server, the enrollment initiation request indicative of an intention to enroll the camera into the video surveillance system.

In some embodiments, the program instructions are further executable by the processing unit for receiving, at the mobile device, at least in part the enrollment information from the server.

In some embodiments, the enrollment information comprising secret information for use by the camera in requesting enrollment from the server.

In some embodiments, the secret information comprises a unique identifier for use by the camera in requesting enrollment from the server.

In some embodiments, the secret information comprises a public encryption key for use by the camera in requesting enrollment from the server.

In some embodiments, the program instructions are further executable by the processing unit for transmitting, by the mobile device, camera location information to the server.

In some embodiments, the camera location information comprises GPS position information of the mobile device.

In some embodiments, the program instructions are further executable by the processing unit for providing, by the mobile device, an indication that the camera has been enrolled in response to receiving confirmation from the server that the camera has been enrolled into the video surveillance system.

In some embodiments, the program instructions are further executable by the processing unit for receiving, at the mobile device, camera configuration information and providing, by the mobile device, the camera configuration information to the camera.

In one aspect, there is provided a non-transitory computer-readable medium having stored thereon program instructions for enrolling a camera into a video surveillance system. The program instructions are executable by a processing unit for: obtaining, by the camera, the enrollment information from the visual information; and transmitting, by the camera, an enrollment request to a server of the video surveillance system based on the enrollment information, the server configured to enroll the camera into the video surveillance system based on the enrollment request.

In some embodiments, the visual information is a visual code having encoded therein the enrollment information, and wherein obtaining the enrollment information comprises extracting, by the camera, the enrollment information from the visual code.

In some embodiments, the enrollment information comprises server location information of the server of the video surveillance system.

In some embodiments, the server location information comprises an IP address of the server, and wherein the enrollment request is transmitted to the IP address of the server.

In some embodiments, the enrollment information comprises secret information for use by the camera in requesting enrollment from the server.

In some embodiments, the secret information comprises a unique identifier, and wherein the enrollment request comprises the unique identifier and an IP address of the camera.

In some embodiments, the secret information comprises a public encryption key, and wherein the enrollment request comprises login credentials for the camera encrypted using the public encryption key.

In some embodiments, reading the visual information comprises reading the visual information from a display of a mobile device.

In one aspect, there is provided a non-transitory computer-readable medium having stored thereon program instructions for enrolling a camera into a video surveillance system. The program instructions are executable by a processing unit for: receiving, at a server of the video surveillance system, an enrollment initiation request from a mobile device, the enrollment initiation request indicative of an intention to enroll the camera into the video surveillance system; receiving, at the server, an enrollment request from the camera; and enrolling, at the server, the camera into the video surveillance system based on the enrollment initiation request from the mobile device and the enrollment request from the camera.

In some embodiments, the program instructions are further executable by the processing unit for transmitting, by the server, enrollment information to the mobile device in response to the enrollment initiation request.

In some embodiments, the enrollment information comprises server location information of the server.

In some embodiments, the server location information comprises an IP address of the server.

In some embodiments, the enrollment information comprises secret information for use by the camera in requesting enrollment from the server.

In some embodiments, the secret information comprises a unique identifier for the camera.

In some embodiments, the camera is enrolled into the video surveillance system when the enrollment request from the camera comprises the unique identifier.

In some embodiments, the secret information comprises a public encryption key.

In some embodiments, the program instructions are further executable by the processing unit for decrypting, at the server, at least in part the enrollment request with a private encryption key corresponding to the public encryption key.

In some embodiments, the program instructions are further executable by the processing unit for creating, at the server, a new camera entry for the camera in response to the enrollment initiation request.

In some embodiments, the enrollment initiation request comprises camera location information, and wherein the program instructions are further executable by the processing unit for storing the camera location information in association with the new camera entry.

In some embodiments, the camera location information comprises GPS position information of the mobile device.

In some embodiments, the camera location information comprises text indicative of a location of the camera.

In some embodiments, the program instructions are further executable by the processing unit for transmitting, by the server, confirmation that the camera has been enrolled to the mobile device.

In some embodiments, the program instructions are further executable by the processing unit for receiving, at the server, camera configuration information from the mobile device and transmitting, by the server, the camera configuration information to the camera.

In one aspect there is provided a method for enrolling a camera into a video surveillance system. The method comprises: receiving, at a mobile device, an indication to enroll the camera into the video surveillance system; obtaining, at the mobile device, audio information indicative of enrollment information for enrolling the camera into the video surveillance system; and outputting, via a speaker of the mobile device, the audio information for being obtained by the camera, the camera configured to request enrollment from a server of the video surveillance system based on the enrollment information obtainable from the audio information.

In one aspect there is provided a mobile device comprising: a speaker; a processing unit; and a non-transitory computer-readable memory having stored thereon program instructions. The program instructions executable by the processing unit for: receiving an indication to enroll a camera into a video surveillance system; obtaining audio information indicative of enrollment information for enrolling the camera into the video surveillance system; and outputting, via the speaker, the audio information for being obtained by the camera, the camera configured to request enrollment from a server of the video surveillance system based on the enrollment information obtainable from the audio information. The speaker may be connected to the processing unit in any suitable manner.

In one aspect there is provided a non-transitory computer-readable medium having stored thereon program instructions for enrolling a camera into a video surveillance system. The program instructions are executable by a processing unit for: obtaining, by a microphone of the camera, audio information indicative of enrollment information for enrolling the camera into the video surveillance system; obtaining, by the camera, the enrollment information from the audio information; and transmitting, by the camera, an enrollment request to a server of the video surveillance system based on the enrollment information, the server configured to enroll the camera into the video surveillance system based on the enrollment request.

In some embodiments, the audio information is a sound wave having encoded therein the enrollment information.

In some embodiments, obtaining the audio information comprises generating, at the mobile device, the audio information to encode therein the enrollment information.

In one aspect there is provided a method for enrolling a camera into a video surveillance system. The method comprises obtaining, by a microphone of the camera, audio information indicative of enrollment information for enrolling the camera into the video surveillance system; obtaining, by the camera, the enrollment information from the audio information; and transmitting, by the camera, an enrollment request to a server of the video surveillance system based on the enrollment information, the server configured to enroll the camera into the video surveillance system based on the enrollment request.

In one aspect there is provided a camera comprising: a microphone; a processing unit; and a non-transitory computer-readable memory having stored thereon program instructions. The program instructions executable by the processing unit for: obtaining, via the microphone, audio information indicative of enrollment information for enrolling the camera into a video surveillance system; obtaining the enrollment information from the audio information; and transmitting an enrollment request to a server of the video surveillance system based on the enrollment information, the server configured to enroll the camera into the video surveillance system based on the enrollment request. The microphone may be connected to the processing unit in any suitable manner.

In one aspect there is provided a non-transitory computer-readable medium having stored thereon program instructions for enrolling a camera into a video surveillance system. The program instructions are executable by a processing unit for: obtaining, by a microphone of the camera, audio information indicative of enrollment information for enrolling the camera into the video surveillance system; obtaining, by the camera, the enrollment information from the audio information; and transmitting, by the camera, an enrollment request to a server of the video surveillance system based on the enrollment information, the server configured to enroll the camera into the video surveillance system based on the enrollment request.

In some embodiments, the audio information is a sound wave having encoded therein the enrollment information, and wherein obtaining the enrollment information comprises extracting, by the camera, the enrollment information from the sound wave.

In some embodiments, obtaining the audio information comprises recording the audio information outputted from a speaker of a mobile device.

In one aspect, there is provided a method for enrolling a camera into a video surveillance system. The method comprises: outputting, via microphone of a mobile device, audio information indicative of enrollment information for enrolling the camera into the video surveillance system; obtaining, by the camera, the audio information to obtain the enrollment information; transmitting, by the camera, an enrollment request to a server of the video surveillance system based on the enrollment information; and enrolling, by the server, the camera into the video surveillance system based on the enrollment request.

In one aspect there is provided a video surveillance system. The video surveillance comprises: a camera configured for obtaining audio information indicative of enrollment information for enrolling the camera into the video surveillance system, obtaining the enrollment information from the audio information, and transmitting an enrollment request to a server of the video surveillance system based on the enrollment information; and the server configured for enrolling the camera into the video surveillance system based on the enrollment request.

In some embodiments, the audio information is a sound wave having encoded therein the enrollment information.

Any of the above features may be used together, in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
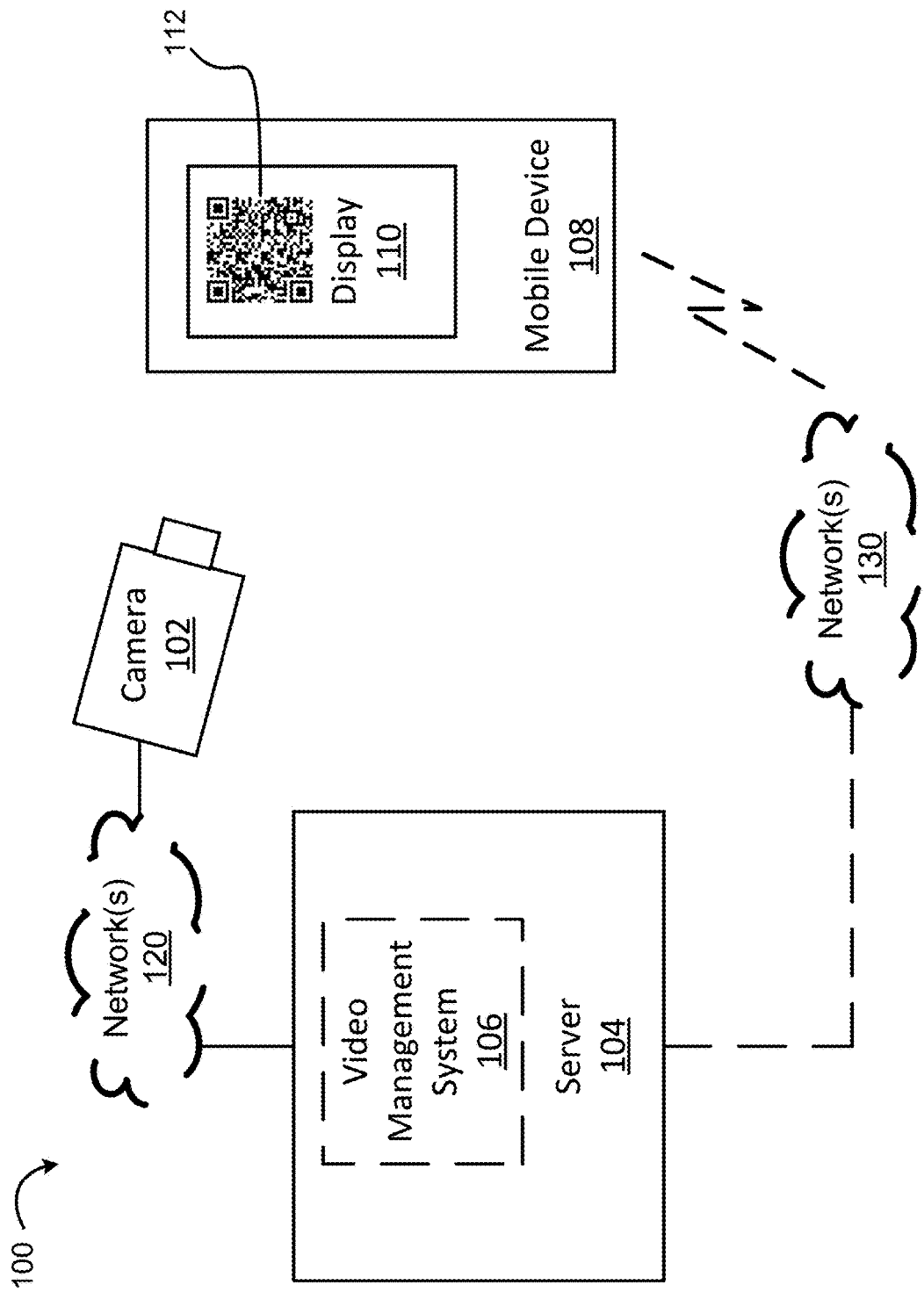
FIG. 1 is a schematic diagram of an example video surveillance system, in accordance with one or more embodiments.

With reference to FIG. 1, there is illustrated an example of a video surveillance system 100. The video surveillance system 100 comprises at least one server 104 and may comprise one or more video cameras already enrolled with the video surveillance system 100. In this example, a camera 102 is to be enrolled into the video surveillance system 100. While embodiments and examples described herein are explained by enrolling the camera 102 into the video surveillance system 100, more than one camera may be enrolled into the video surveillance system 100 according to the methods and/or systems described herein.

The server 104 may be any suitable computing device(s), such as one or more computers, a server clusters, a mainframe, a computing cluster, a cloud computing system, a distributed computing system, a portable computing device, or the like. The server 104 may be a backend server. The server 104 is configured to receive video data from one or more cameras connected to the server 104, such as from camera 102. The video data corresponds to at least one or more images captured by the camera(s). The camera(s) may communicate with the server 104 by use of one or more wires, such as one or more network cables, by use of any suitable network equipment, and/or by wireless communication. The camera(s) may communicate with the server 104 using one or more networks 120. The network(s) 120 may comprise one or more public networks (e.g., the Internet) and/or one or more private networks. The network(s) 120 may comprise one or more of a personal area network (PAN), local area network (LAN), mesh network, metropolitan area network (MAN), wide area network (WAN), wireless network, Wi-Fi network, cellular network and/or any other suitable network(s).

The server 104 may be or may comprise an archiver for archiving the video data. The server 104 may managing the camera(s), providing a workstation environment, for example, for live view of the camera feed(s) or for controlling camera(s), and/or providing or controlling access to camera feed(s) by remote workstation(s). The server 104 may provide a video management system (VMS) 106, which may provide any of the described functions of the server 104. The VMS 106 may be a software application running on the server 104 and which provides VMS services. The VMS 106 may receive the video data from the camera 102 and any other cameras of the video surveillance system 100, may store the video data to a storage device and/or provide an interface to both view a live video feed provide by the video data of a given camera, and access stored video data. The VMS 106 may be implemented by Genetec™ Security Center. In some embodiments, the VMS 106 is a separate computing device connected to the server 104, such as one or more computers, a server clusters, a mainframe, a computing cluster, a cloud computing system, a distributed computing system, a portable computing device, or the like.

The camera 102 may be any suitable camera comprising at least one optical sensor. The optical sensor may also be referred to as an image sensor. The camera 102 may comprise one or more computing devices for implementing the functionality of the camera 102. The camera 102 is configured to obtain one or more images based on information captured by the optical sensor and transmit video data comprising the one or more captured images to the server 104. The camera 102 may be an Internet Protocol (IP) camera. The camera 102 may transmit video data using Transmission Control Protocol/Internet Protocol (TCP/IP) protocol to the server 104. In some embodiments, the video data may be transmitted in real-time or near real-time from the camera 102 to the server 104. In some embodiments, the video data may be stored at a storage device of the camera 102 or at a storage device connected to the camera 102. In other words, in some embodiments, the camera 102 may implement edge recording.

In this example, the camera 102 is not yet enrolled into the video surveillance system 100. Accordingly, the camera 102 is unable to communicate with the server 104 and/or does not yet have a suitable (e.g., secure) channel of communication with the server 104. Prior to enrollment, the camera 102 may be connected to the network 120 that it will ultimately use to communicate with the server 104. That is, the camera 102 may be physically installed where it is to be located and may then be connected to the network 120. The camera 102 is configured to process visual information 112 displayed in front of a lens of the camera 102 and obtained by the optical sensor. The visual information 112 obtained by the camera 102 is indicative of enrollment information for enrolling the camera 102 into the video surveillance system 100. The visual information 112 may be any suitable information that is indicative of the enrollment information. The visual information 112 may display the enrollment information or may have encoded therein the enrollment information. The enrollment information corresponds to any suitable information needed by the camera 102 for communicating with the server 104 in order to enroll the camera 102 into the video surveillance system 100. The camera 102 may process the visual information 112 to obtain the enrollment information and uses the enrollment information for communicating with the server 104 in order to enroll the camera 102 into the video surveillance system 100. The camera 102 may communicate with the server 104 using a known communication protocol, such as Hypertext Transfer Protocol (HTTP) or Hypertext Transfer Protocol Secure (HTTPS). The camera 102 may implement any suitable logic with the computing device(s) of the camera 102 to implement the aforementioned functionality, such as a camera-run application. The camera-run application may be the AXIS Camera Application Platform or any other suitable camera-run application. The camera logic for obtaining the visual information 112 indicative of enrollment information may automatically run at start-up of the camera 102, such as at the time of powering on the camera 102 or connecting the camera 102 to the network 120, which causes the camera 102 to scan for visual information in any suitable manner. Alternatively, the camera 102 may be connected thereto in any suitable manner to instruct the camera 102 to scan for the visual information 112.

It should be appreciated that by having visual information 112 indicative of enrollment information displayed in front of the camera 102 and having the camera 102 interpret this information 112 in order to request enrollment, that the camera 102 may be enrolled into the video surveillance system 100 without the need of specialized expertise, may be less time consuming than conventional enrollment, may simplify the task, may reduce error in the enrollment process and/or may reduce the cost of installation of large number of cameras into the video surveillance system 100.

The visual information 112 indicative of enrollment information may be provided by use of a mobile device 108, as is shown in FIG. 1. The mobile device 108 may be any suitable portable computing device, such as a mobile phone, a smart phone, a tablet, a laptop computer, a smart watch, or the like. The mobile device 108 may have any suitable network interface for communicating with the server 104. The mobile device 108 may communicate with the server 104 by use of one or more wires, such as one or more network cables, by use of any suitable network equipment, and/or by wireless communication. The mobile device 108 may communicate with the server 104 over one or more networks 130. The network(s) 130 may comprise one or more public networks (e.g., the Internet) and/or one or more private networks. The network(s) 130 may comprise one or more of a PAN, MAN, LAN, WAN, mesh network, wireless network, Wi-Fi network, cellular network and/or any other suitable network(s). The network(s) 130 may comprise some or all of the network(s) 120. In some embodiments, the network(s) 130 may be the same as the network(s) 120. In some embodiments, the network(s) 130 may be different from the network(s) 120.

The visual information 112 may be displayed on a display 110 of the mobile device 108. The mobile device 108 may comprise the display 110 or may be connected to the display 110. The display 110, for example, may be as a cathode ray tube display screen, a light-emitting diode display screen, a liquid crystal display screen, a touch screen, or any other suitable display device. A larger display 110 may make it possible for the camera 102 to scan the visual information 112 from a further distance given the larger area for displaying the visual information 112. The visual information 112 may be a visual code that has encoded therein the enrollment information. The visual code may be a one-dimensional linear barcode, for example, such as provided by International Standard ISO/IEC 15417, 15420, 16388, or 16390. The visual code may be a two-dimensional matrix code, for example, such as provided by International Standard ISO/IEC 24778, 16022, or 18004. In some embodiments, the visual code used is a Quick Response (QR) code or a data matrix code. The visual code may be any other suitable visual code. In the example illustrated in FIG. 1, the visual information 112 is a QR code, which is provided for example purposes only. In some embodiments, the visual information 112 displays the enrollment information.

The enrollment information may comprise server location information of the server 104 of the video surveillance system 100. The server location information may comprise an IP address of the server 104. The server location information may comprise a port number for communicating with the server 104. The server location information may comprise a uniform resource locator (URL) of the server 104, a media access control (MAC) address of the server 104, a hostname of the server 104, or any other suitable information indicative of the location of the server 104. The enrollment information may comprise secret information for use by the camera 102 in requesting enrollment from the server 104. The secret information may be used by the camera 102 to identifying itself to the server 104 and/or for communicating with the server 104. Accordingly, the secret information may be an identity providing secret or a cryptography secret. For example, the secret information may be an identifier, such as a unique identifier assigned to the camera 102 by the server 104. By way of another example, the secret information may be an encryption key, such as a public encryption key that the server 104 has the corresponding private encryption key. The secret information may also be used by the camera 102 for communicating with the server 104 after enrollment. The enrollment information may comprise configuration information for the camera 102. The camera configuration information may correspond to information for configuring the operation of the camera 102. The camera configuration information may correspond to information indicative of the capabilities of the camera 102. The camera configuration information may comprise preferred settings for the camera 102. The camera configuration information may comprise manufacture information of the camera 102. The camera configuration information (e.g., the manufacture information and/or the preferred settings) may comprise any one or more of the following: framerate information for the camera 102, bit rate and/or compression details for the camera 102; name and/or type information for the camera 102. The enrollment information may comprise any other suitable information. The visual information 112 may convey any other suitable information in addition to the enrollment information.

The mobile device 108 may obtain the visual information 112 in any suitable manner. The mobile device 108 may receive the visual information 122 from the server 104 or may generate the visual information 112. The visual information 112 may be generated at the mobile device 108 based on enrollment information stored on the mobile device and/or based on enrollment information provided from the server 104. For example, the mobile device 108 may have the server location information stored therein and receive the secret information from the server 104, and then generates the visual information 112, such as a visual code, based on the stored server location information and the received secret information. By way of another example, the mobile device 108 may receive the server location information and the secret information from the server 104, and then generates the visual information 112, such as the visual code, based on the received server location information and received secret information. By way of yet another example, the mobile device 108 may receive the server location information from the server 104, and then generates the visual information 112, such as the visual code, based on the received server location information. By way of a further example, the mobile device 108 may have the server location information stored therein, and then generates the visual information 112, such as a visual code, based on the stored server location information. Accordingly, the visual information 112 may be indicative of the server location information, the secret information and/or the camera configuration information. Similarly, a visual code may be generated to have encoded therein the server location information, the secret information and/or the camera configuration information.

The server 104 may be on the same network as the mobile device 108 and the mobile device 108 may be provided with server details to communicate with the server 104 (or vice versa), making it possible to implement this technology even on a closed network. In other implementations, the mobile device 108 may be accessing internet/cloud-based services which puts it into communication with the server 104 (which may itself be cloud-based).

Figure 2C:
FIG. 2C is a screenshot of a graphical user interface of a mobile device for providing an indication that a camera has been enrolled into a video surveillance system, in accordance with one or more embodiments.
Figure 2B:
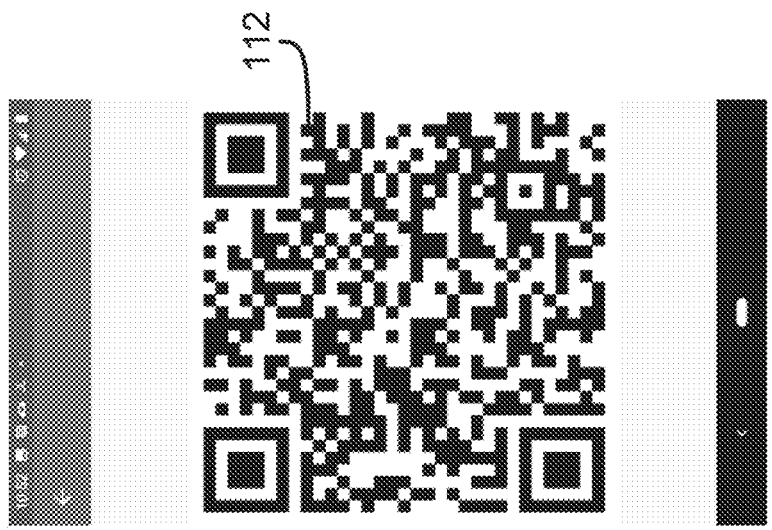
FIG. 2B is a screenshot of a graphical user interface of a mobile device for providing a visual code having encoded therein enrollment information for enrolling a camera into a video surveillance system, in accordance with one or more embodiments.
Figure 2A:
FIG. 2A is a screenshot of a graphical user interface of a mobile device for initiating enrollment of a camera into a video surveillance system, in accordance with one or more embodiments.

An application for enrolling a camera into a video surveillance system running on the mobile device 108 may be used to coordinate enrollment of the camera 102 into the video surveillance system 100. With additional reference to FIG. 2A to 2C, a graphical user interface (GUI) of the mobile device 108 illustrates a specific and non-limiting example of the application. A user may open the application and may indicate via the application the intention to enroll a camera, such as camera 102. As shown in FIG. 2A, the user may select the "enroll" button to indicate the intention to enroll the camera 102. Alternatively, opening the application may indicate the intention to enroll the camera 102. The application may request that the user authenticate to the server 104. The user may authenticate to the server 104 by providing credentials (e.g., a user name and password), either via the application, via the server 104 or both. The application may then provide the visual information 112 on the display 110 of the mobile device 108 after the intention to enroll is received and/or after the user has authenticated to the server 104. More specifically, the visual information 112 may be displayed via the GUI of the mobile device 108, for example such as shown in FIG. 2B. The visual information 112 may then be provided to the camera 102 by the user placing it in front of the camera's lens so that it may be read by the optical sensor. Once the camera 102 has received the visual information 112, the camera 102 may communicate with the server 104 to request enrollment into the video surveillance system 100 based on the visual information 112. The server 104 may enroll the camera 104 and then communicate to the mobile device 108 that the camera 104 was successfully enrolled. The mobile device 108 may then provide an indication of successful enrollment such as an image, a sound and/or a vibration. For example, FIG. 2C illustrates an example of the GUI illustrating a successful enrollment. It should be appreciated that after the user has provided the visual information 112 to the camera 102 via the mobile device 108, there may be no further intervention required by the user to enroll the camera 102, which may lead to a simplified and/or improved enrollment process of the camera 102 into the video surveillance system 100. In some embodiments, the server 104 may contact the camera 102 to obtain the camera configuration information or may obtain the camera configuration information from the mobile device 108. The server 104 may communicate with the camera 102 in order to configure the camera 102 with the camera configuration information (e.g., setting one or more of framerate, bit rate, compression details, etc.) to complete the enrollment process. Once the camera 102 is enrolled, the camera 102 may provide video data to the server 104. The settings for the camera 102 may be modified after the camera 102 is enrolled, for example, via the application. The set camera configuration information for the camera 102 may be viewable on the mobile device 108 (e.g., via the application). The mobile device 108 (e.g., via the application) may be able to obtain a video stream corresponding to the video data from the server 104 in order to view real-time or near real-time video and/or verify that the camera 102 is enrolled and/or configured properly.

In some embodiments, the visual information 112 (e.g., the visual code) may be on a piece of paper and the piece of paper may be displayed in front of the lens of the camera 102. The visual information 112 (e.g., the visual code) may be printed onto the piece of paper by a printer (e.g., connected to the server 104, connected to the mobile device 108, or connected to any other suitable computing device, such as a computer connected to the server 104). In some embodiments, server 104 may implement at least some of functionality of the mobile device 108, and/or the server 104 may provide the visual information 112 to the camera 102 by a display associated with the sever 104. Accordingly, in some embodiments, the mobile device 108 may be omitted. The visual information 112 may be provided to the camera 102 in any other suitable manner.

Figure 3:
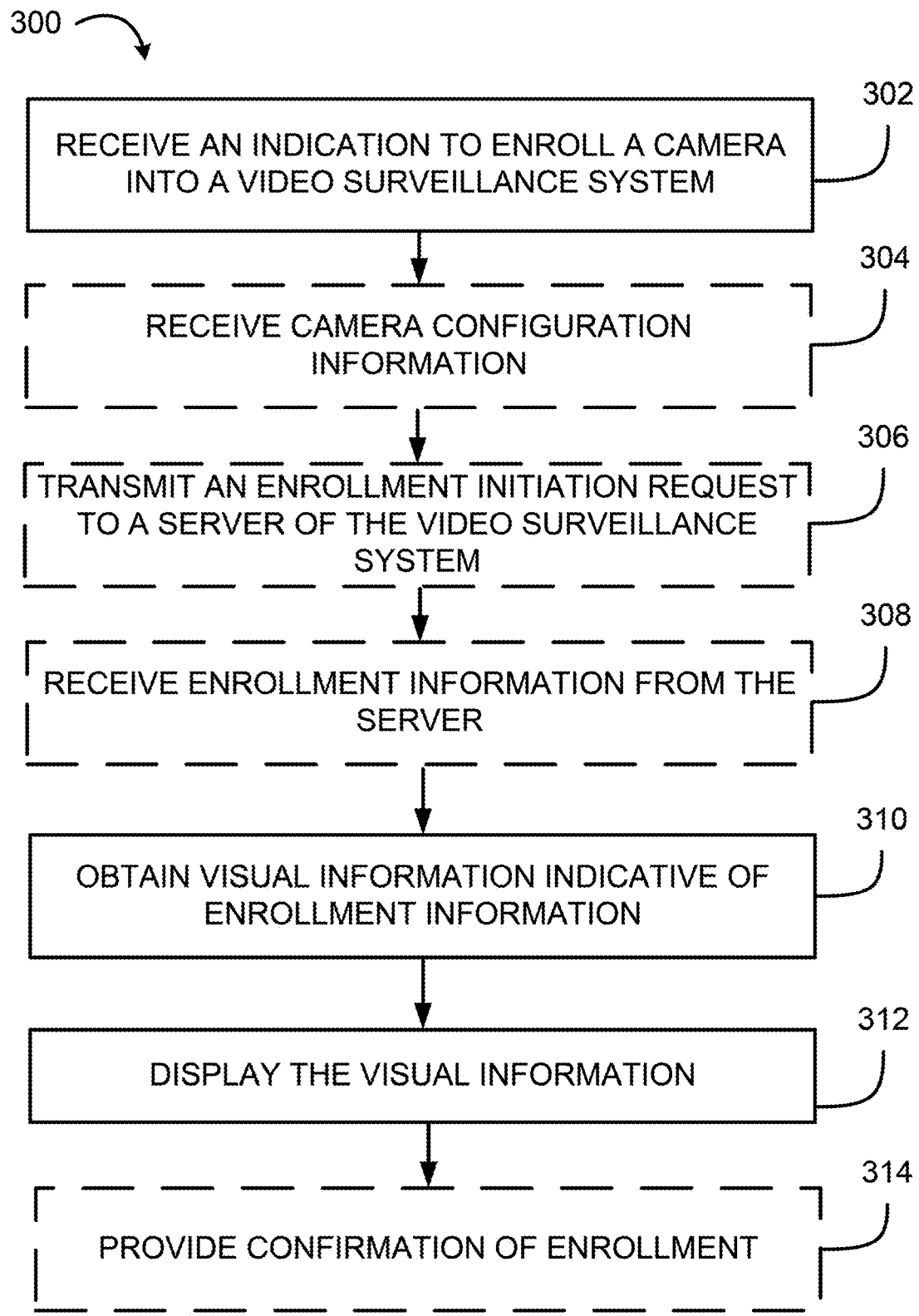
FIG. 3 is a flowchart illustrating an example method performed by a mobile device for enrolling a camera into a video surveillance system, in accordance with one or more embodiments.

With reference to FIG. 3, there is shown a flowchart illustrating an example method 300 for enrolling a camera into a video surveillance system, such camera 102 into video surveillance system 100. The method 300 is performed at a mobile device, such as mobile device 108. At step 302, an indication is receive to enroll a camera 102 into a video surveillance system 100. The indication to enroll the camera 102 may be received at the mobile device 108 in any suitable manner. For example, a user may open the application for enrolling a camera into a video surveillance system running on the mobile device 108 in order to provide the indication. By way of another example, the user may open the application and indicate in the application the intention to enroll a camera. For instance, the user may click an "enroll" button, such as shown in the example of FIG. 2A. The user may have to authenticate to the sever 104 (e.g., by provided credentials) via the application that the user is authorized to enroll a camera, which may occur prior to or after the user provides the indication in the application for the intention to enroll a camera. In some embodiments, the indication may be received at the mobile device 108 from the server 104, as a user may initiate the enrollment process via the server 104.

At step 304, in some embodiments, camera configuration information for configuring the camera 102 is received. The camera configuration information may be received after the indication to enroll the camera 102 is received. For example, after the user clicks the "enroll" button, the user may be given the option to provide camera configuration information via the application. The camera configuration information may be received at any other suitable time during the performance of the method 300. For instance, the camera configuration information may be received after performance of step 314 (discussed below). For example, after an indication of successfully enrollment of the camera 102 is provided, the user may be given the option to provide camera configuration information via the application. The mobile device 108 may transmit the camera configuration information to the server 104, which provides the camera configuration information to the camera 102, or the mobile device 108 may visually provide the camera configuration information to camera 102 (e.g., via the visual information at step 310 or by a separate visual code having encoded therein the camera configuration information).

At step 306, in some embodiments, an enrollment initiation request is transmitted to a server 104 of the video surveillance system 100. The enrollment initiation request may be transmitted from the mobile device 108 to the server 104 in response to receiving the indication to enroll the camera 102 into the video surveillance system 100. The enrollment initiation request may be transmitted for the purposes of indicating to the server 104 that the mobile device 108 intends to enroll the camera 102 into the video surveillance system 100. The enrollment initiation request may be to request enrollment information, such as to request the server location information (e.g., if not already known at the mobile device 108) and/or to request the secret information. In some embodiments, the request of the server location information and/or the secret information may be made separate from the enrollment initiation request. In some embodiments, the enrollment initiation request may comprise the camera configuration information.

In some embodiments, at step 306, camera location information may be transmitted to the server 104. For example, the camera location information may be provided as part of the enrollment initiation request. The camera location information may comprise geolocation information that identifies or estimates the real-world geographical location of the camera 102. The geolocation information may be GPS position information of the mobile device 108, a MAC address or IP address of a wireless access point (e.g., a Wi-Fi router) having a known location that the mobile device 108 is connected thereto, etc. The GPS position information may be obtained from a GPS unit of the mobile device 108. The camera location information may comprise text indicative of the location of the camera 102. The camera location information may be inputted into the mobile device 108 by a user. For example, if the camera 102 is installed in an elevator, the user may input the text as "elevator". The camera location information may be transmitted to the server 104 from the mobile device 108 at any other suitable time during the performance of the method 300.

At step 308, in some embodiments, enrollment information, at least in part, is received from the server 104. Some or all of the enrollment information may be received, in response to the enrollment initiation request. The server location information and/or the secret information may be received at step 308 as part of the received enrollment information. In some embodiments, the server location information may already be known at the mobile device 108 and the server location information may be omitted from the received enrollment information. The secret information may be omitted from the received enrollment information when no secret information is used. In some embodiments, the enrollment information received from the server 104 is in the form of the visual information 112 (e.g., a visual code). The specific enrollment information received may vary depending on practical implementations.

At step 310, visual information 112 indicative of enrollment information is obtained. The visual information 112 may be obtained in response to receiving the indication to enroll the camera 102 into the video surveillance system 100 at step 302. In some embodiments, the visual information 112 may be obtained in response receiving some or all of the enrollment information from the server 104 at step 308. The visual information 112 may be a visual code having encoded therein the enrollment information. In some embodiments, obtaining the visual information 112 at step 310 may comprise receiving the visual information 112 (e.g., the visual code) from the server 104. In some embodiments, obtaining the visual information 112 at step 310 may comprise generating, at the mobile device 108, the visual information (e.g., generating the visual code to encode therein the enrollment information). The enrollment information conveyed by the visual information 112 may vary depending on practical implementations. For example, the enrollment information conveyed by the visual information 112 may comprise the server location information. By way of another example, the enrollment information conveyed by the visual information 112 may comprise the server location information and the secret information. By way of yet another example, the enrollment information conveyed by the visual information 112 may comprise the server location information, the secret information and the camera configuration information.

At step 312, the visual information 112 is displayed on a display 110 of the mobile device 108. Displaying the visual information 112 may comprise displaying the visual code. The visual information 112 is for being read by the camera 102, as the camera 102 is configured to request enrollment into the video surveillance system 100 based on the enrollment information obtainable from the visual information 112. More specifically, the camera 102 is configured to request from the server 104 enrollment into the video surveillance system 100 based on the enrollment information. The visual information 112 may be provided to the camera 102 by the user placing the display 110 of the mobile device 108 in front of the camera's lens in order for the visual information 112 to be captured by the optical sensor of the camera 102.

At step 314, in some embodiments, an indication that the camera 102 has been enrolled into the video surveillance system 100 is provided. For instance, the mobile device 108 may receive a confirmation of enrollment from the server 104 and the mobile device 108 may then provide the indication that the camera 102 has been enrolled. The indication that the camera 102 has been enrolled may be displayed on the display 108 (e.g., an image indicating successful enrollment), may be a sound output from the mobile device 108 and/or may be a vibration of the mobile device 108. The vibration and/or sound may indicate to the user of successful enrollment even when the display 108 of the mobile device 108 is facing the camera (e.g., is not visible by the user).

Figure 4:
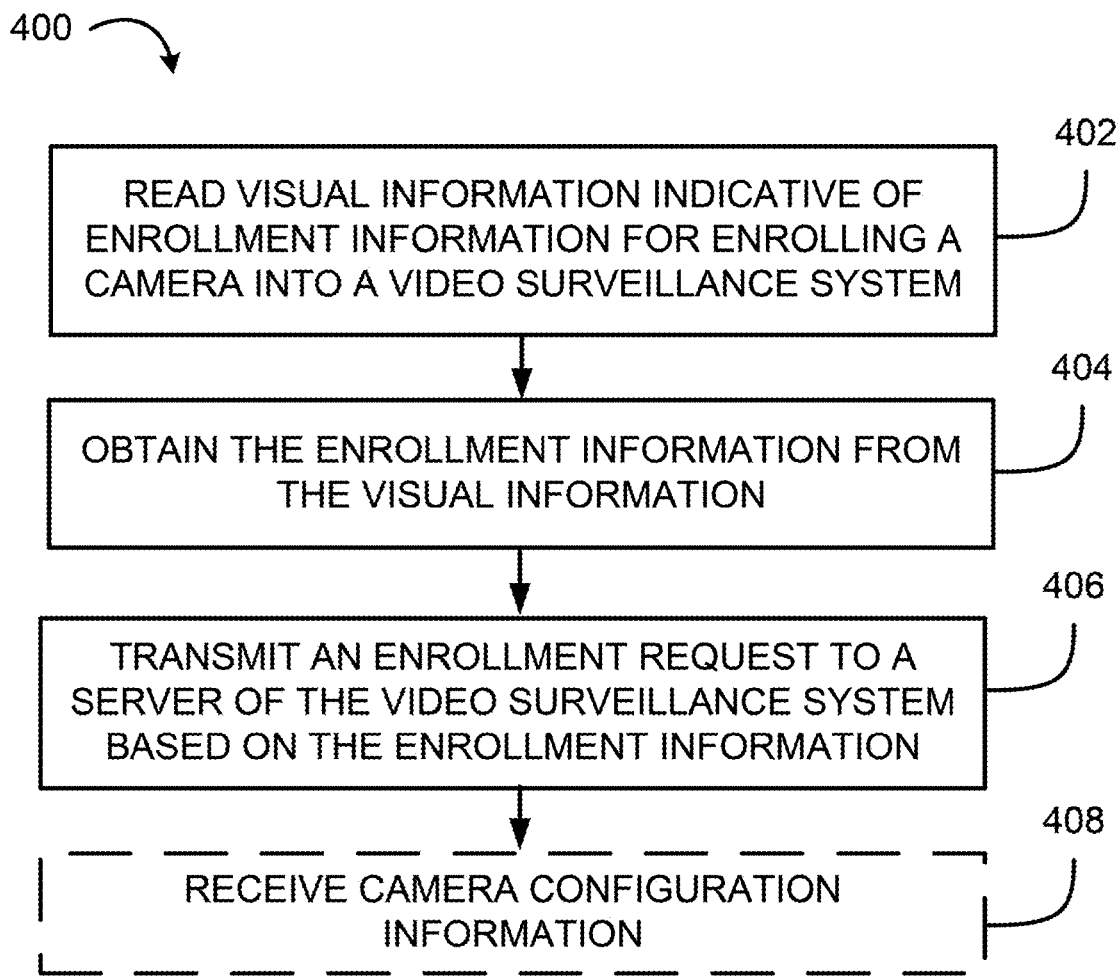
FIG. 4 is a flowchart illustrating an example method performed by a camera for enrolling the camera into a video surveillance system, in accordance with one or more embodiments.

With reference to FIG. 4, there is shown a flowchart illustrating an example method 300 for enrolling a camera into a video surveillance system, such camera 102 into video surveillance system 100. The method 400 is performed at a camera, such as camera 102. Prior to performance of the method 400, the camera 102 may be connected to a network 120 that will be used to communicate with a server 104 of the video surveillance system and/or, if required, the camera 102 may be activated or turned on.

At step 402, visual information 112 indicative of enrollment information for enrolling a camera 102 into a video surveillance system 100 is read. The visual information 112 may be read by the optical sensor of the camera 102 in any suitable manner. In some embodiments, reading the visual information at step 402 comprises reading the visual information from a display 110 of a mobile device 108 placed in front of the camera's lens. In some embodiments, reading the visual information at step 402 comprises reading the visual information 112 off of a piece of paper having printed thereon the visual information 112. In some embodiments, the visual information 112 comprises a visual code that has encoded therein the enrollment information. The enrollment information may comprise the server location information, the secret information and/or the camera configuration information. The enrollment information conveyed by the visual information 112 may vary depending on practical implementations.

At step 404, the enrollment information may be obtained from the visual information 112. The camera 102 may obtain the enrollment information from the visual information 112 in any suitable manner. For example, obtaining the enrollment information at step 404 may comprise reading the enrollment information from the visual information 112. By way of another example, obtaining the enrollment information at step 404 may comprise extracting the enrollment information from a visual code, when the visual information 112 is a visual code. In some embodiments, step 404 comprises obtaining the server location information (e.g., an IP address) from the visual information 112. In some embodiments, the server location information may already be known by the camera 102. In some embodiments, step 404 comprises obtaining the secret information (e.g., a unique identifier and/or a public encryption key) from the visual information 112. In some embodiments, step 404 comprises obtaining the camera configuration information from the visual information. When the visual information 112 is a visual code, the server location information, the secret information and/or the camera configuration information may be extracted from the visual code. Any other suitable information may be obtained from the visual information 112.

At step 406, an enrollment request is transmitted to a server 108 of video surveillance system 100 based on the enrollment information. The server 108 is configured to enroll the camera 102 into the video surveillance system 100 based on the enrollment request from the camera 102. The enrollment request comprises information pertaining to the camera 102. The enrollment request may comprise an IP address of the camera 102 and/or login credentials (e.g., username and password) for the camera 102. The enrollment request may comprise the unique identifier obtained from the enrollment information. The enrollment request may be encrypted with the encryption key (e.g., a public encryption key) obtained from the enrollment information. Alternatively, information to be conveyed by the enrollment request may be encrypted with the encryption key to generate encrypted information for the enrollment request. For example, the login credentials for the camera 102 may be encrypted with the public encryption key. The enrollment request may be sent to the server 104 based on the server location information obtained from the enrollment information. For example, the enrollment request may be sent to the IP address of the server 104. By way of another example, the enrollment request may be sent to the IP address and port number of the server 104. The camera 102 may connect to the server 104 in any suitable manner to provide the enrollment request and, once enrolled at the server 104, the camera 102 may communicate the video data to the server 104.

At step 408, in some embodiments, camera configuration information is received for configuring the camera 102. The camera 102 may configure its operations based on the camera configuration information. The camera 102 is configured according to the camera configuration information. In some embodiments, the camera configuration information is provided to the camera 102 from the server 104. In some embodiments, the camera configuration information is provided to the camera 102 visually. For example, the camera configuration information may be provided by the enrollment information via the visual information 112 as part of step 404. By way of another example, the camera configuration information may be provided by way of further visual information, such as an additional visual code that has encoded therein the camera configuration information.

Figure 5:
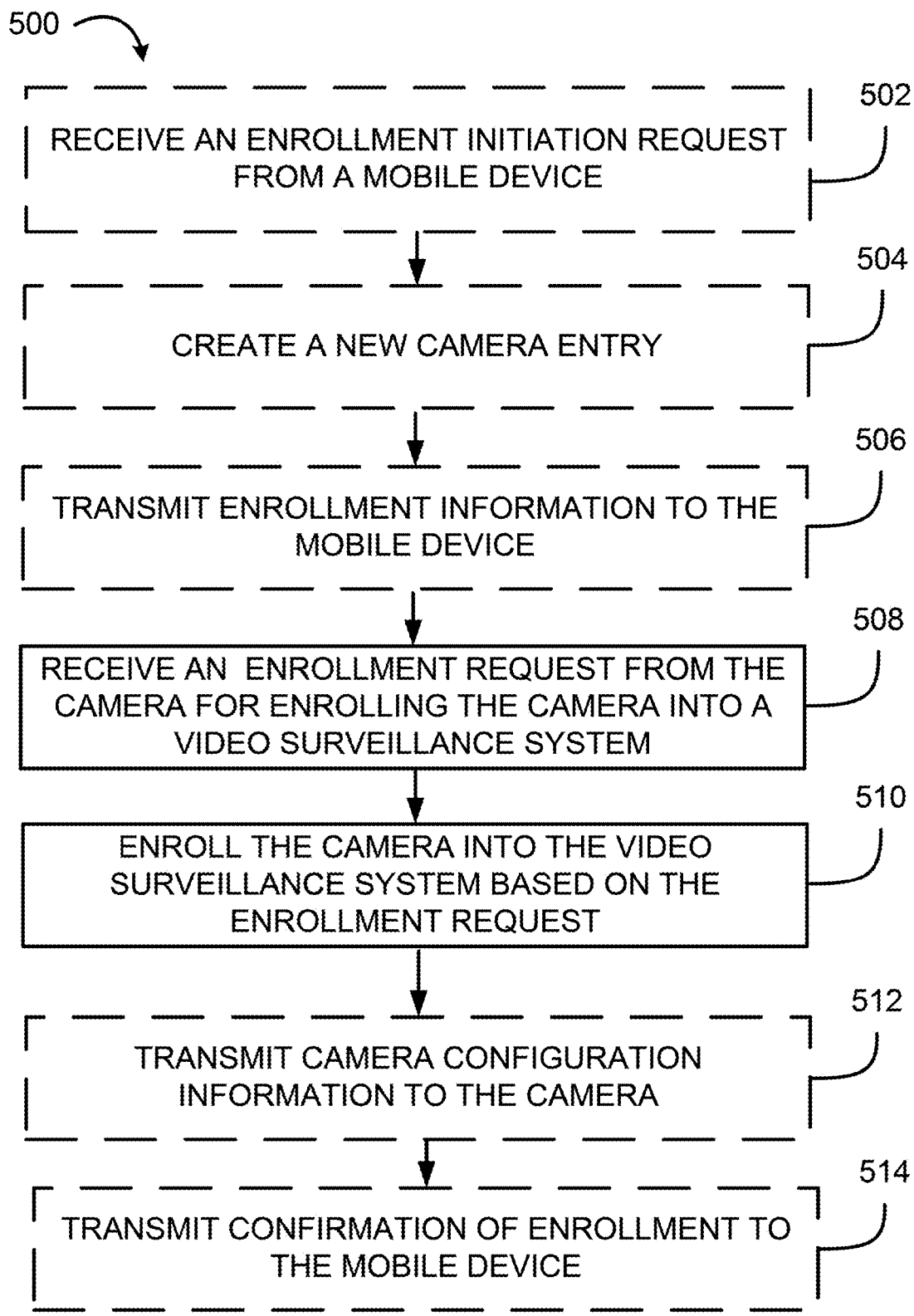
FIG. 5 is a flowchart illustrating an example method performed by a server for enrolling a camera into a video surveillance system, in accordance with one or more embodiments.

With reference to FIG. 5, there is shown a flowchart illustrating an example method 300 for enrolling a camera into a video surveillance system, such camera 102 into video surveillance system 100. The method 500 is performed at a server of a video surveillance system, such as server 104.

At step 502, in some embodiments, an enrollment initiation request is received from a mobile device 108. The server 104 may receive the enrollment initiation request in any suitable manner. The enrollment initiation request may be as described elsewhere in this document, for example, as described in relation to step 306 of FIG. 3.

At step 504, in some embodiments, a new camera entry is created at the server 108 in response to the enrollment initiation request. The new camera entry is for storing information relating to the camera 102 at the server 104 in order to enroll the camera 102 into the video surveillance system 100. For example, the new camera entry may be a new camera object which is created in the software running on the server 104. By way of another example, the new camera entry may be an entry in a database stored on the server 104. The new camera entry may be associated with a unique identifier for the camera 102 and the server 104 may transmit the unique identifier to the mobile device 108 for being providing to the camera 102 via the visual information 112. The unique identifier may be generate at the server 104, for example, when the new camera entry for the camera 102 is created and stored therein. The unique identifier may be used by the camera 102 to demonstrate to the server 104 that it is indeed the camera which was provided the visual information 112. In some embodiments, the enrollment initiation request comprises the camera location information (e.g., GPS position, text, etc.) which may be stored at the server 104 in association with the new camera entry for the camera 102. The camera entries at the sever 104 may be used to map incoming video data to a corresponding camera (e.g., based on the IP addresses stored in the camera entries and the IP address associated with the video data).

At step 506, in some embodiments, enrollment information is transmitted to the mobile device 108 in response to the enrollment initiation request. The enrollment information transmitted by the server 104 may vary depending on practical implementations. The enrollment information provided at step 506 may be as described elsewhere in this document, for example, as described in relation to step 308 of FIG. 3. The server 104 may transmit the server information and/or the secret information to the mobile device 108 at step 506. In some embodiments, the server 108 may generate the visual information 112 (e.g., generate the visual code by encoding the enrollment information therein) and transmit the visual information 112 to the mobile device 108 at step 506.

At step 508, an enrollment request is received from a camera 102 for enrolling the camera 102 into a video surveillance system 100. The server 104 may receive the enrollment request in any suitable manner. The enrollment request may be as described elsewhere in this document, for example, as described in relation to step 406 of FIG. 4. In some embodiments, the enrollment request is at least in part decrypted with an encryption key (e.g., a private encryption key corresponding to the public encryption key) to obtain the contents of the enrollment request. The enrollment request or encrypted information conveyed by the enrollment request may be decrypted to obtain login credentials for the camera 102, the IP address of the camera 102, the unique identifier, and/or any other suitable information. When the enrollment request is encrypted or conveys encrypted information this may allow for the camera 102 to provide information (e.g., login credentials) to the server 104 securely and thus allow for the camera 102 to be enrolled securely.

At step 510, the camera 102 is enrolled into the video surveillance system 100 based on the enrollment request. The server 104 may enroll the camera 102 into the video surveillance system 100 in any suitable manner. The server 104 may store camera information conveyed by the enrollment request in one or more databases of the server 104 for the purposes of enrolling the camera into the video surveillance system 100. The camera 102 may be enrolled by storing the login credentials for the camera 102, the IP address of the camera 102 and/or any other suitable information provided by the enrollment request at the server 104. Enrolling the camera 102 may allow for the server 104 to known the relevant information of the camera 102 (e.g., identity, capabilities, configuration, etc.) in order to communicate with the camera 102 and/or to receive video data from the camera 102.

In some embodiments, at step 510, the camera 102 is enrolled into the video surveillance system 100 based on the enrollment request from the camera 102 and the enrollment initiation request from the mobile device 108. This is because the mobile device 108 may initiating the enrollment process at the server 104 by transmitting the enrollment initiation request to the server 104, which causes the server 104 to expect the enrollment request from the camera 102. For instance, as described above, when the enrollment initiation request is received from the mobile device 108, the new camera entry may be created at the server 104, the unique identifier for the camera 102 may be stored in the new camera entry and the unique identifier may be transmitted to the mobile device 108. Accordingly, at step 510, the server 104 may enroll the camera 102 into the video surveillance system 100 when the unique identifier provided by the enrollment request from the camera 102 corresponds to the unique identifier stored in the new camera entry for that camera 102. The server 104 may store the IP address of the camera 102 and the camera credentials in association with the new camera entry corresponding to camera 102.

At step 512, in some embodiments, camera configuration information is transmitted to the camera 102. The server 104 may transmit the camera configuration information to the camera 102 once the server 104 has enrolled the camera 102. The camera configuration information may have been provided to the server 104 from the mobile device 108 and forwarded to the camera 102.

At step 514, in some embodiments, a confirmation of enrollment is transmitted to the mobile device 108. The server 104 may transmit the confirmation to the mobile device 108 is any suitable manner. The confirmation of enrollment indicates that the camera 102 has been enrolled into the video surveillance system 100.

Once the camera 102 is enrolled into the video surveillance system 100, the camera 102 may provide video data to the server 104. The server 104 may be able to access the camera 102, for example using the camera credentials, in order to obtain the video data. The server 104 may accordingly be able to identify the video data coming the camera 102. For example, the video data may indicate the IP address of the camera 102 providing the video data, which the server 104 may use to identify that the video data is coming from the camera 102. The video data may be encrypted (e.g., with the public encryption key) and may be decrypted by the server 104 (e.g., with the private encryption key). The server 104 may store the video data to a storage device and/or provide an interface to both view a live video feed provide by the video data of a given camera, and access stored video data, etc.

Figure 6:
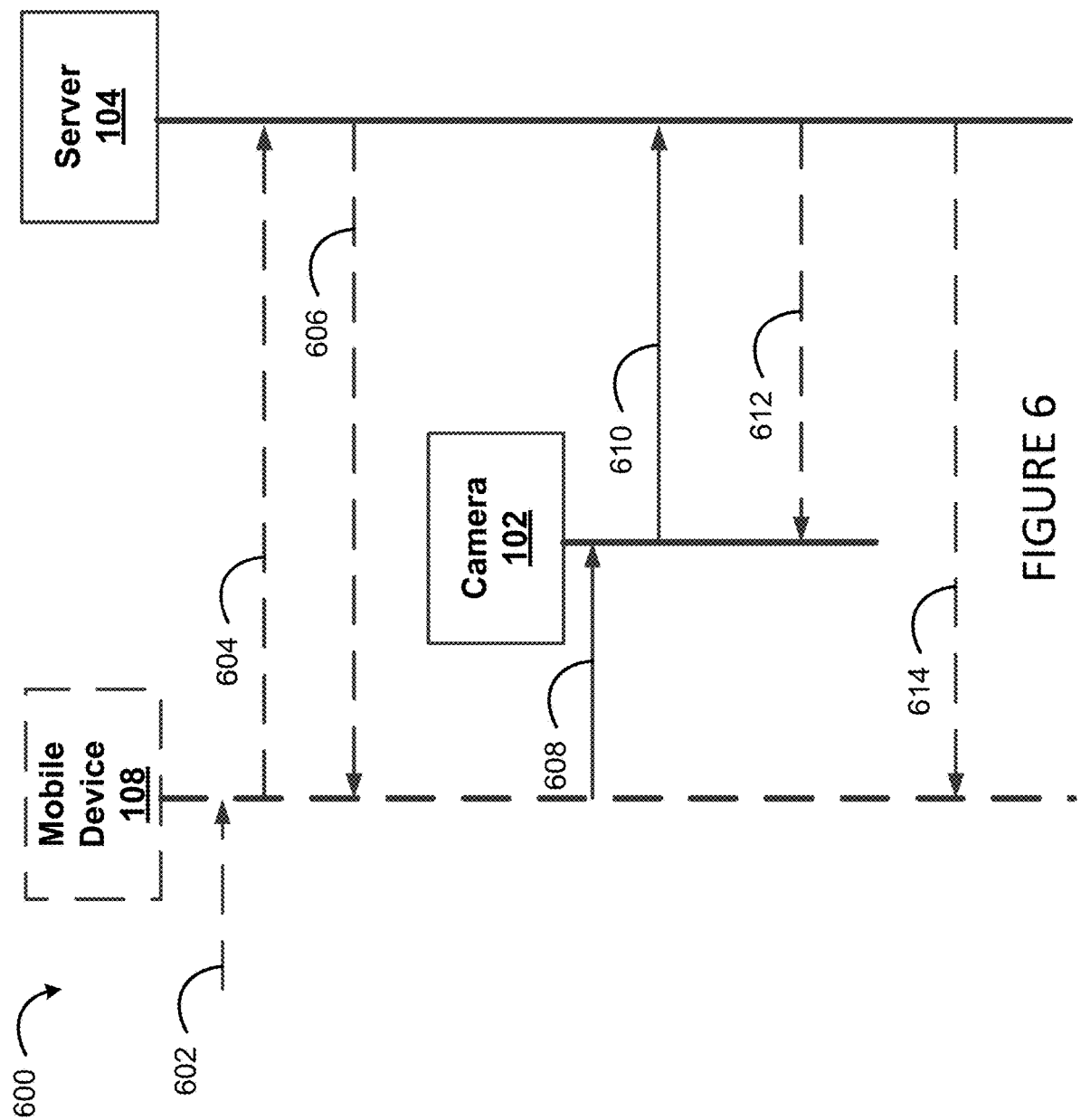
FIG. 6 is signal flow diagram illustrating an example method for enrolling a camera into a video surveillance system, in accordance with one or more embodiments.

With reference to FIG. 6, there is shown a signal flow diagram illustrating an example method 600 for enrolling a camera into a video surveillance system, such as camera 102 into video surveillance system 100.

At step 602, in some embodiments, an indication is receive at a mobile device 108 to enroll a camera 102 into a video surveillance system 100. The indication may be as described elsewhere in this document, for example, as described in relation to step 302 of FIG. 3.

At step 604, in some embodiments, an enrollment initiation request is transmitted to a server 104 of the video surveillance system 100 from the mobile device 108. The enrollment initiation request may be as described elsewhere in this document, for example, as described in relation to step 306 of FIG. 3.

At step 606, in some embodiments, the server 104 transmits enrollment information to the mobile device 108. The mobile device 108 receives the enrollment information from the server 104. The enrollment information may be as described elsewhere in this document, for example, as described in relation to step 308 of FIG. 3 and/or step 506 of FIG. 5.

At step 608, the camera reads the visual information 112. The visual information 112 may be provided by a display of the mobile device 108. The visual information 112 may be displayed by the mobile device 108 as described elsewhere in this document, for example, as described in relation to step 312 of FIG. 3. The visual information 112 may be read as described elsewhere in this document, for example, as described in relation to step 402 of FIG. 4. The camera obtains the enrollment information from the visual information 112. The enrollment information may be obtained from the visual information 112 as described elsewhere in this document, for example, as described in relation to step 404 of FIG. 4.

At step 610, the camera transmits an enrollment request to the server 104 based on the enrollment information. The enrollment request may be as described elsewhere in this document, for example, as described in relation to step 406 of FIG. 4 and/or step 508 of FIG. 5. The server 104 enrolls the camera 102 into the video surveillance system 100. The server 104 may enroll the camera 102 into the video surveillance system 100 as described elsewhere in this document, for example, as described in relation to step 510 of FIG. 5.

At step 612, in some embodiments, the server 108 transmits camera configuration information to the camera 102. The camera configuration information may as described elsewhere in this document, for example, as described in relation to step 304 of FIG. 3, step 408 of FIG. 4 and/or step 512 of FIG. 5.

At step 614, in some embodiments, the server 104 transmits confirmation of enrollment of the camera 102 into the video surveillance system 100 to the mobile device 108. The confirmation of enrollment may be as described elsewhere in this document, for example, as described in relation to step 514 of FIG. 5. The mobile device 108 may provide an indication of the confirmation of enrollment. The indication may be provided as described elsewhere in this document, for example, as described in relation to step 314 of FIG. 3.

Figure 7:
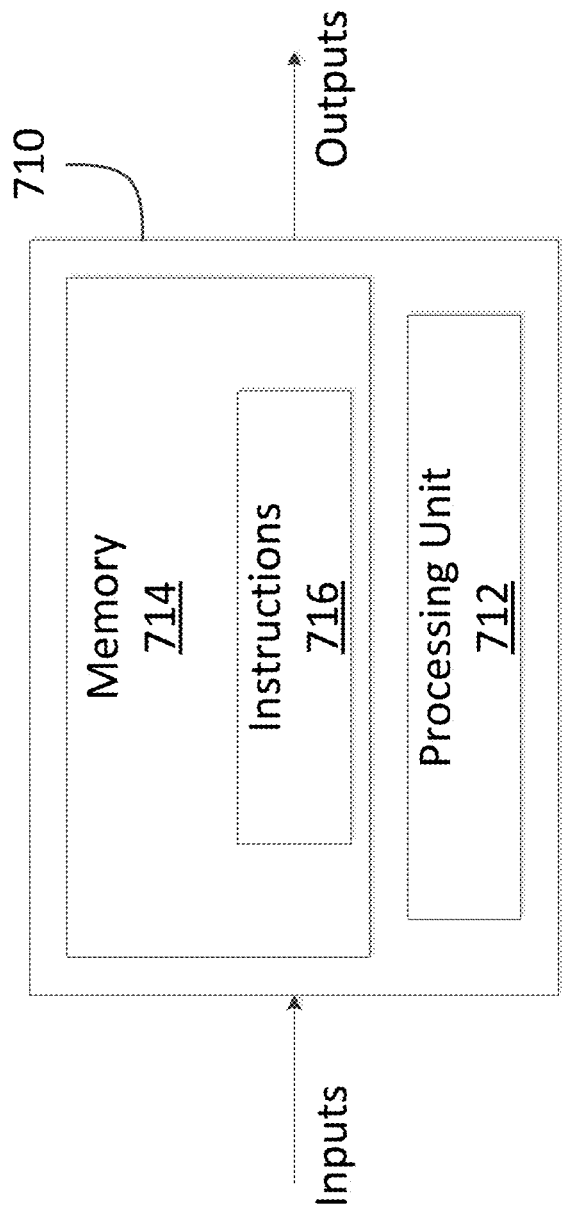
FIG. 7 is a schematic diagram of an example computing device, in accordance with one or more embodiments.

With reference to FIG. 7, the method(s) 300, 400, 500, and/or 600 may be implemented by a computing device 710, comprising a processing unit 712 and a memory 714 which has stored therein computer-executable instructions 716. The camera 102, the server 104, the VMS 106, and/or the mobile device 108 may each be implemented by and/or comprise a computing device, such as the computing device 710. The processing unit 712 may comprise any suitable devices configured to implement the method(s) 300, 400, 500, and/or 600 such that instructions 716, when executed by the computing device 710 or other programmable apparatus, may cause the functions/acts/steps performed as part of the method(s) 300, 400, 500, and/or 600 as described herein to be executed. The processing unit 712 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

The methods and systems for enrolling a camera into a video surveillance system described herein may be implemented in a high level procedural or object oriented programming or scripting language, or a combination thereof, to communicate with or assist in the operation of a computer system, for example the computing device 710. Alternatively, the methods and systems for enrolling a camera into a video surveillance system may be implemented in assembly or machine language. The language may be a compiled or interpreted language. Program code for implementing the methods and systems for enrolling a camera into a video surveillance system may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for enrolling a camera into a video surveillance system may also be considered to be implemented by way of a non-transitory computer-readable storage medium having a computer program stored thereon. The computer program may comprise computer-readable instructions which cause a computer, or in some embodiments the processing unit 712 of the computing device 710, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

It should be noted that the term "server" used herein indicates network equipment which may provide server-like functions or take on server-like roles. However, it is not meant to designate a particular role in a server-client relationship or to defining a role in terms of initiator or responder in communications. Indeed, it is possible that in some embodiments, cameras behave as "servers" in the terms server-client relationship and the server may behave as a "client" or initiator of communication.

In alternative embodiments, the visual information 112 may be provided off-camera. For example, a separate piece of equipment may be provided between the camera 102 and the network 120, which receives the camera's video (e.g. by behaving as the server 104 to the camera 102). This piece of equipment may be used to emulate the camera 102 for the real server 104 and may be enrolled in the manner described herein, by interpreting the visual information 112 provided to the camera 102, which is in turn provided to it by the camera 102 in the form of video feed. Such a piece of equipment may have other functions such as network sanitization to prevent unauthorized network behavior by the camera 102.

While the above description describes systems and methods for enrolling a camera into a video surveillance system, the systems and/or methods described herein may be applied to enrolling any suitable networked device into a system. For example, the networked device may comprise any suitable input mechanism (e.g., camera, microphone, etc.) for obtaining enrollment information in to a system. For instance, devices having sound input capability (e.g. microphones or microphone-comprising devices) may be provided with audio information which may be interpreted by logic such as voice or sound recognition. In such cases, what would have been provided as visual information in the above embodiments and examples may be even spoken to the device by a user (e.g. information being provided by the mobile device or otherwise obtained from the server). Alternatively, a sound incomprehensible to humans (machine sounds) may be used, e.g. to avoid detection by humans of secret information provided to the enrolled device. In some embodiments, the "visual information" indicative of the enrollment information may be replaced in the embodiments described herein with "sound information" indicative of the enrollment information. The sound information may be any suitable sound wave that may be outputted by a speaker of the mobile device 108 that conveys the enrollment information. The audio information may be obtained by a microphone of the camera 102 (or other networked device). The camera 102 (or other networked device) may be configured to request enrollment from the server 104 based on the enrollment information obtainable from the audio information. The audio information may be a sound wave having encoded therein the enrollment information. The sound way may have the enrollment information encoded therein in order to be incomprehensible to humans. The enrollment information may be obtained at the camera 102 (or other networked device) by extracting the enrollment information from the sound wave. In some embodiments, the sound wave may correspond to spoken words of the enrollment information without any encoding. In some embodiments, obtaining the audio information at the camera 102 (or other networked device) comprises recording the audio information outputted from a speaker of the mobile device 108.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for enrolling a camera into a video surveillance system, the method comprising:
   obtaining, at a mobile device, an indication to enroll the camera into the video surveillance system;
   obtaining, at the mobile device, enrollment information from a server of the video surveillance system;
   displaying, on a display of the mobile device, a visual code for being read by the camera, the visual code encoding therein the enrollment information for use by the camera in requesting the enrollment into the video surveillance system based on the enrollment information;
   receiving, at the mobile device, an enrollment confirmation from the video surveillance system, the enrollment confirmation comprising camera configuration information; and
   generating, by the mobile device, an alert in response to receiving the enrollment confirmation, the alert comprising a first alert portion that is perceptible by a user even when the mobile device is facing the camera and a second alert portion comprising the camera configuration information.

2. The method of claim 1, comprising generating the visual code based on the enrollment information.

3. The method of claim 1, wherein the enrollment information comprises server location information of the server of the video surveillance system.

4. The method of claim 1, wherein the enrollment information comprises a server encryption key for use by the camera in requesting enrollment into the video surveillance system.

5. The method of claim 1, wherein the enrollment information comprises a public encryption key for use by the camera to generate encrypted login credentials of the camera by encrypting login credentials of the camera with the public encryption key, wherein displaying the visual code encoding therein the enrollment information is further for use by the camera in transmitting the encrypted login credentials of the camera to the server for the server in enrolling the camera into the video surveillance system at least in part based on decryption of the encrypted login credentials with a private encryption key corresponding to the public encryption key in obtaining the login credentials of the camera.

6. The method of claim 1, wherein the enrollment information comprises a unique identifier assigned to the camera by the server for use by the camera in requesting enrollment into the video surveillance system.

7. The method of claim 1, further comprising:
transmitting, by the mobile device, an enrollment initiation request to a server of the video surveillance system, the enrollment initiation request indicative of an intention to enroll the camera into the video surveillance system; and
wherein said obtaining of the enrollment information occurs subsequent to said transmitting of the enrollment initiation request.

8. The method of claim 1, further comprising transmitting, by the mobile device, camera location information to the server for use by the server in storing the camera location information as part of a new camera entry associated with the camera, the camera location information comprising a geolocation of the mobile device that identifies a real-world geographical location of the camera.

9. The method of claim 1, further comprising providing, by the mobile device, the camera configuration information to the camera.

10. The method of claim 1, wherein said generating of the alert comprises generating an audible alert perceptible by the user even when the mobile device is facing the camera.

11. The method of claim 1, wherein said generating of the alert comprises generating a tactile alert perceptible by the user even when the mobile device is facing the camera.

12. The method of claim 1, wherein said generating of the alert comprises displaying, on the of the mobile device, a visual confirmation that the camera has been enrolled into the video surveillance system.

13. A mobile device comprising:
a display;
a processing unit; and
a non-transitory computer-readable memory having stored thereon program instructions executable by the processing unit for:
obtaining an indication to enroll a camera into a video surveillance system;
obtaining enrollment information from a server of the video surveillance system;
displaying, via the display, a visual code for being read by the camera, the visual code encoding therein the enrollment information for use by the camera in requesting enrollment into the video surveillance system based on the enrollment information;
receiving an enrollment confirmation from the video surveillance system, the enrollment confirmation comprising camera configuration information; and
generating an alert in response to receiving the enrollment confirmation, the alert comprising a first alert portion that is perceptible by a user even when the mobile device is facing the camera and a second alert portion comprising the camera configuration information.

14. The mobile device of claim 13, wherein the program instructions are further executable by the processing unit for generating the visual code based on the enrollment information.

15. The mobile device of claim 13, wherein the enrollment information comprises server location information of the server of the video surveillance system.

16. The mobile device of claim 13, wherein the enrollment information comprises an encryption key for use by the camera in requesting the enrollment into the video surveillance system.

17. The mobile device of claim 13, wherein the enrollment information comprises a unique identifier assigned to the camera by the server for use by the camera in requesting the enrollment into the video surveillance system.

18. The mobile device of claim 13, wherein the program instructions are further executable by the processing unit for:
transmitting, by the mobile device, an enrollment initiation request to a server of the video surveillance system, the enrollment initiation request indicative of an intention to enroll the camera into the video surveillance system; and
wherein said obtaining of the enrollment information occurs subsequent to said transmitting of the enrollment initiation request.

19. The mobile device of claim 13, wherein the program instructions are further executable by the processing unit for transmitting camera location information to the server for use by the server in storing the camera location information as part of a new camera entry associated with the camera, the camera location information comprising a geolocation of the mobile device that identifies a real-world geographical location of the camera.

20. The mobile device of claim 13, wherein the program instructions are further executable by the processing unit for providing the camera configuration information to the camera.

21. The mobile device of claim 13, wherein said generating of the alert comprises generating an audible alert perceptible by the user even when the mobile device is facing the camera.

22. The mobile device of claim 13, wherein said generating of the alert comprises generating a tactile alert perceptible by the user even when the mobile device is facing the camera.

23. The mobile device of claim 13, wherein said generating of the alert comprises displaying, on the of the mobile device, a visual confirmation of the enrollment of the camera.

* * * * *